(12) United States Patent
Fluckiger

(10) Patent No.: US 8,151,646 B2
(45) Date of Patent: Apr. 10, 2012

(54) DIFFERENTIAL MODE LASER DETECTION AND RANGING DEVICE

(75) Inventor: David U. Fluckiger, Allen, TX (US)

(73) Assignee: Raytheon Company, Waltham, MA (US)

( * ) Notice: Subject to any disclaimer, the term of this patent is extended or adjusted under 35 U.S.C. 154(b) by 682 days.

(21) Appl. No.: 12/258,147

(22) Filed: Oct. 24, 2008

(65) Prior Publication Data

US 2010/0101327 A1     Apr. 29, 2010

(51) Int. Cl.
*G01B 11/00* (2006.01)
(52) U.S. Cl. .......................................... 73/655; 356/502
(58) Field of Classification Search ..................... 73/655, 73/657; 356/502
See application file for complete search history.

(56) References Cited

U.S. PATENT DOCUMENTS

| | | | |
|---|---|---|---|
| 6,598,478 B2 * | 7/2003 | Rice | 73/655 |
| 6,643,000 B2 | 11/2003 | Fluckiger | 356/28 |
| 7,114,393 B2 * | 10/2006 | Langdon | 73/643 |
| 7,193,720 B2 * | 3/2007 | Gatt | 356/489 |

FOREIGN PATENT DOCUMENTS

| | | |
|---|---|---|
| WO | WO 86/06845 | 11/1986 |
| WO | WO 02/063237 | 8/2002 |
| WO | WO 03/089955 | 10/2003 |
| WO | WO 2007/113810 | 10/2007 |

OTHER PUBLICATIONS

Notification of Transmittal of the International Search Report and the Written Opinion of the International Searching Authority, or the Declaration for PCT/ US2009/059313 (14 pages), Mar. 8, 2010.

* cited by examiner

*Primary Examiner* — John Chapman, Jr.
(74) *Attorney, Agent, or Firm* — Christie, Parker & Hale, LLP

(57) ABSTRACT

According to one embodiment, a system for measuring vibration includes multiple spatially separated detectors coupled to a differential signal analyzer and a light source. The light source generates a coherent light beam onto a target that is reflected as backscattered light. The differential signal analyzer receives signals from each of the detectors indicative of backscattered light from the target. The differential signal analyzer then applies a phase shift to a subset of the received signals and combines the phase shifted signals with signals from other detectors to form a differential signal representative of physical vibration of the target.

16 Claims, 4 Drawing Sheets

US 8,151,646 B2

DIFFERENTIAL MODE LASER DETECTION AND RANGING DEVICE

TECHNICAL FIELD OF THE DISCLOSURE

This disclosure generally relates to light detection and ranging devices, and more particularly, to a laser detection and ranging device used to generate various differential vibration modes of a target and a method of operating the same.

BACKGROUND OF THE DISCLOSURE

Laser detection and ranging devices (LADARS) transmit a coherent light beam at targets and measure various aspects of these targets using backscattered light from the light beam. Laser detection and ranging devices differ from radio detection and ranging device (RADARS) in that laser detection and ranging devices use light energy rather than radio-frequency energy as a operational medium. Laser detection and ranging devices may have certain advantages over their radar counterparts in that they may be used to measure non-conductive targets that are generally transparent to radio-frequency energy. Lasers used to generate the light beam produce a coherent beam of monochromatic light that may be ideally suited for use with laser detection and ranging devices.

SUMMARY OF THE DISCLOSURE

According to one embodiment, a system for measuring vibration includes multiple spatially separated detectors coupled to a differential signal analyzer and a light source. The light source generates a coherent light beam onto a target that is reflected as backscattered light. The differential signal analyzer receives signals from each of the detectors indicative of backscattered light from the target. The differential signal analyzer then applies a phase shift to a subset of the received signals and combines the phase shifted signals with signals from other detectors to form a differential signal representative of physical vibration of the target.

Some embodiments of the disclosure may provide numerous technical advantages. For example, one embodiment of a differential mode laser detection and ranging device may provide an advantage over known laser detection and ranging device implementations due to its attenuation of sources of noise inherent with the piston vibration mode. The differential mode laser detection and ranging device combines phase shifted signals from the detectors in a manner such that the piston mode element of the backscattered light is common mode and thus attenuated. Because the detectors and the atmosphere may be sources of piston mode noise, attenuation of these noise sources may enhance operation of the differential mode laser detection and ranging device. Frequency noise inherent in the production of the coherent light beam by the light source may also be mitigated by differentially combining multiple signals from backscattered light originating from the unitary light source.

Some embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

Laser detection and ranging devices (LADARS) measure various characteristics of targets using reflected light that is commonly referred to as backscattered light. Characteristics of targets measured by laser detection and ranging devices may include their speed, size, and general complexity of their surface features. Although laser detection and ranging devices may provide enhanced information over radio detection and ranging device (RADARS) due to their light beam's ability to be reflected from generally non-conductive targets, the quality of information may be limited by various forms of noise inherent with the propagation of light through the atmosphere. For example, propagation of light may generate unwanted noise due to atmospheric turbulence effects that are not easily controlled. These atmospheric turbulence effects may be caused by air currents and/or temperature gradients that may change relatively often within the light beam's path.

Known laser detection and ranging devices measure characteristics of targets using a vibration mode that is generally parallel with the propagation direction of the backscattered light beam. This vibration mode is commonly referred to as a piston mode due to vibrational movement of the target toward and away from the laser detection and ranging device. Accurate measurement of targets using the piston vibration mode may be relatively difficult, however, due to inherent noise generated by atmospheric turbulence or other types of noise sources associated with this vibrational mode.

Figure 1:
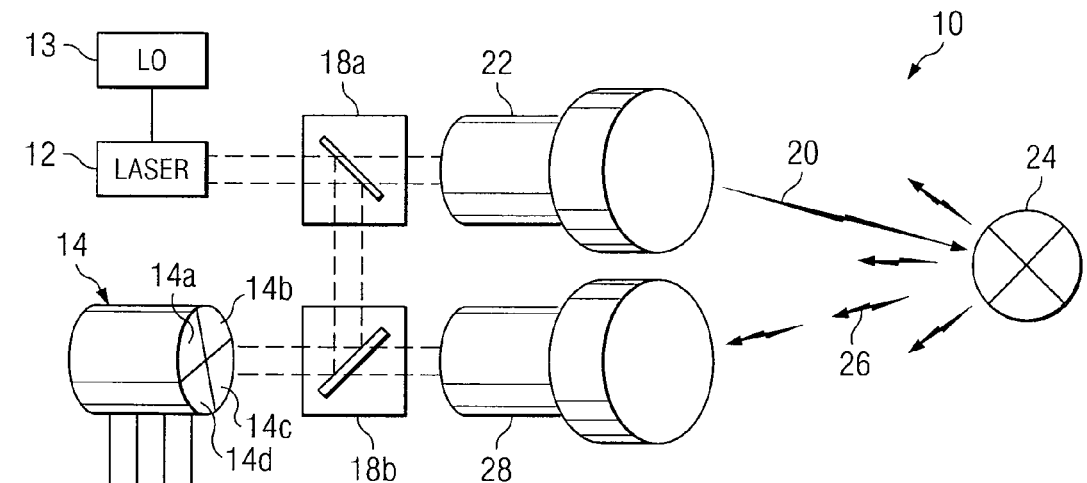
FIG. 1 is a diagram showing one embodiment of an differential mode laser detection and ranging device according to the teachings of the present disclosure.
Figure 1:
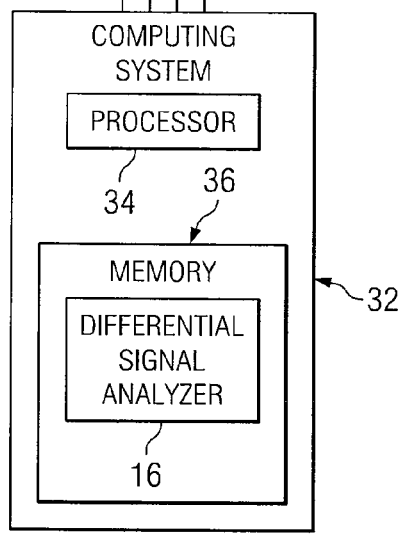

FIG. 1 shows one embodiment of a laser detection and ranging device 10 that may provide a solution to this problem and other problems. Laser detection and ranging device 10 includes a laser 12 coupled to a local oscillator 13, and a detector array 14 coupled to a differential signal analyzer 16 as shown. Laser 12 generates a coherent light beam 20 through a beam splitter 18a and a transmission telescope 22 that is directed towards a distally located target 24. Backscattered light 26 reflected from target 24 is collected by detector array 14 through a receiving telescope 28 that focuses the backscattered light 26. Detector array 14 includes four detectors 14a, 14b, 14c, and 14d that are spatially separated from one another with respect to the direction of the backscattered light 26. Each detector 14a, 14b, 14c, and 14d mixes received backscattered light 26 with a portion of the light generated by beam splitter 18a and another beam splitter 18b. According to the teachings of the present disclosure, differential signal analyzer 16 applies a phase shift to the signals of one or more detectors 14a, 14b, 14c, and 14d relative to the other detectors 14a, 14b, 14c, and 14d, and combines these signals to form a differential signal representative of physical vibration of target 24.

Certain embodiments of laser detection and ranging device 10 may provide an advantage over known laser detection and ranging device implementations due to higher order modes of vibration detected. As the distance of the target 24 from detector array 14 increases, the incident light beam 20 is reflected from target 24 over a larger portion of its area. This larger area may cover relatively more vibration modes having a relatively large number of phase relationships. Thus, the larger laser spot covers more and more vibration modes which may have numerous phase relationships. By exploiting the higher order vibrational modes, many inherent noise sources can be made common mode and rejected in processing which may effectively lower the noise floor, depending on the environment.

Laser 12 may be any type of coherent light source that transmits light beam 20 and receives backscattered light 26 with sufficient luminous intensity for processing its modulated characteristics. Light beams produced by lasers may have a relatively narrow frequency bandwidth that may be well suited for signal analysis using of various differential vibration modes. In one embodiment, telescope 22 may be provided for directing light beam 20 generated by laser 12 to target 24. In another embodiment, transmitting telescope 22 may be independent of receiving telescope 22. In this configuration, light beam 20 and backscattered light 26 may be processed separately for reducing cross-talk noise between light beam 20 and backscattered light 26.

Detectors 14a, 14b, 14c, and 14d of detector array 14 are aligned along a plane that is generally normal to the direction of the backscattered light. In this manner, application of a 180 degree phase shift of one or more detectors 14a, 14b, 14c, and 14d relative to the other detectors yields a differential signal in which the piston mode element is common mode and thus attenuated. In the particular embodiment shown, detector array 14 includes four spatially separated detectors 14a, 14b, 14c, and 14d. In other embodiments, detector array 14 may include any plural number of detectors that are configured to receive and process backscattered light 26. Implementation of four detectors may provide processing of differing vibrational modes of target 24 by combining various combinations of their outputs. Table 1 shows the various vibrational modes of target 24 that may be sensed due to various differential combinations of the outputs of detectors 14a, 14b, 14c, and 14d and their phase shift applied.

TABLE 1

Vibrational Modes of Quad Detector Array

|    | Quad 1 | Quad 2 | Quad 3 | Quad 4 |
|----|--------|--------|--------|--------|
| S0 | +      | +      | +      | +      |
| D1 | +      | +      | −      | −      |
| D2 | +      | −      | −      | +      |
| D3 | +      | −      | +      | −      |
| T1 | +      | +π/2   | −      | −π/2   |
| T2 | +      | −π/2   | −      | +π/2   |

As shown, S0 indicates the piston mode element in which all detectors 14a, 14b, 14c, and 14d are summed equally with no phase shift relative to one another. D1, D2, and D3 are the horizontal, vertical, and tilt differential vibration mode elements, respectively, of the backscattered light 26. T1 and T2 are the left and right handed tortional vibration modes, respectively, of the backscattered light 26. The symbol "−" indicates a 180 degree phase shift of a detector 14a, 14b, 14c, and 14d relative to another detector 14a, 14b, 14c, and 14d indicated by the symbol "+" whereas the "Π/2" symbol indicates a 90 degree phase shift.

Differential signal analyzer 16 may be operable to simultaneously combine signals or alternatively combine signals from each of detectors 14a, 14b, 14c, and 14d for various vibration modes of target 24.

Differential signal analyzer 16 includes executable instructions that are executed on a computing system 32 using a processor 34 and a memory 36 for storage of the instructions. In one embodiment, computing system 32 may be, for example, a network coupled computing system or a stand-alone computer. The stand-alone computer may be, for example, a personal computer, a laptop computer, a mainframe computer, a personal digital assistant (PDA), or a dedicated embedded processor, such as a digital signal processor (DSP) coupled with other associated logic circuitry. The network computing system may be a number of computers coupled together via a network, such as a local area network (LAN), a metropolitan area network (MAN), or a wide area network (WAN).

Figure 2A:
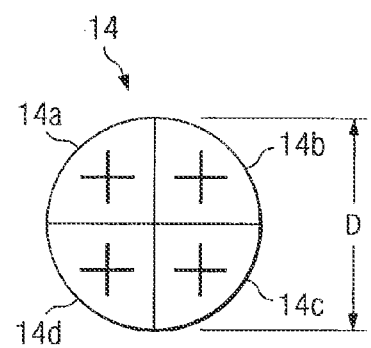
FIG. 2A is front elevational view of the detector array of FIG. 1 having four detectors with "+" symbols indicating that the differential signal analyzer combines all signals with no phase shift.
Figure 2B:
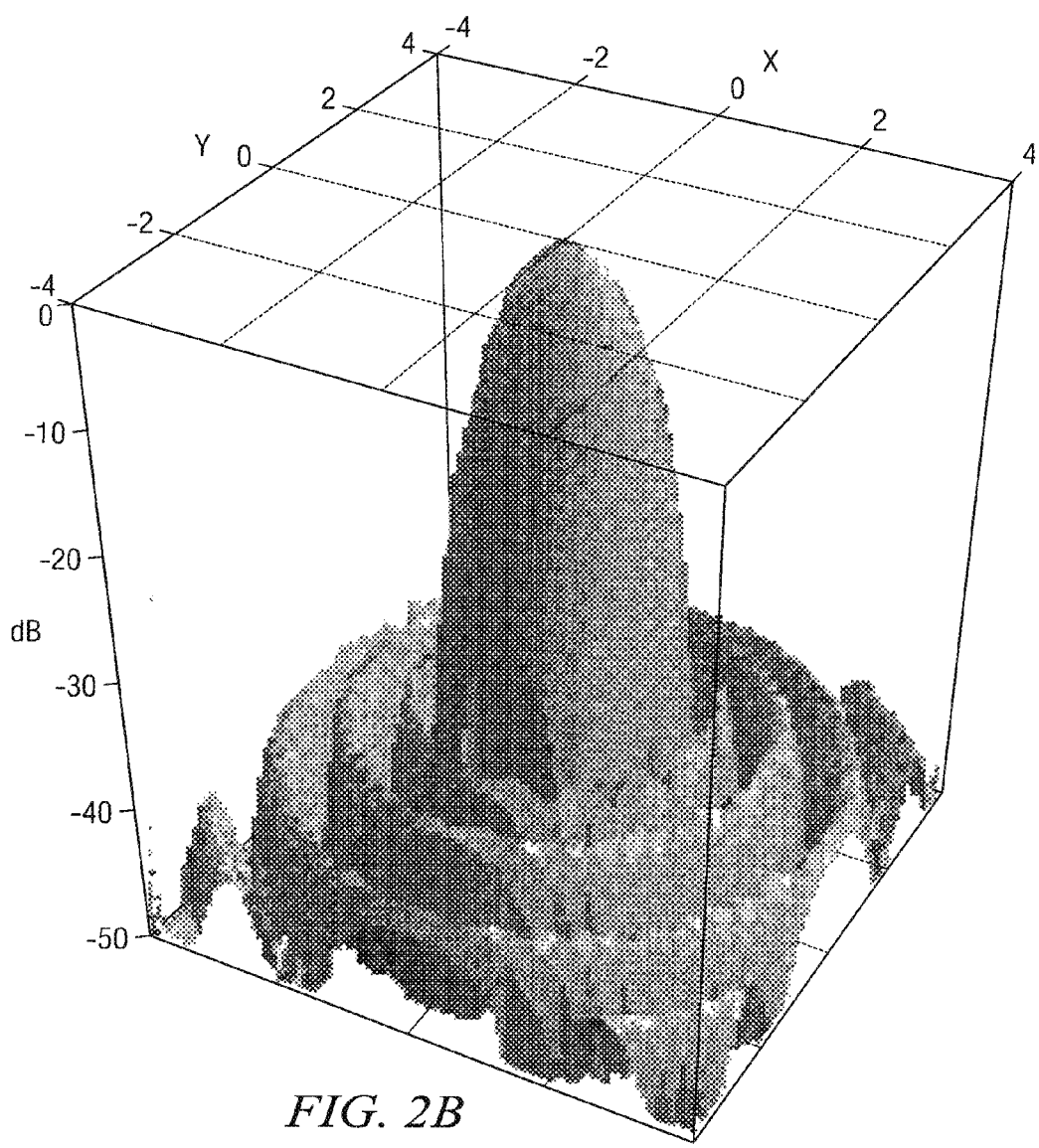
FIG. 2B is a three-dimensional graph showing a resulting power intensity pattern due to combining signals from detector array according to the arrangement of FIG. 2A.

FIGS. 2A and 2B show a diagram of detector array 14 and a three-dimensional graph, respectively, showing a resulting power intensity pattern due to combining signals from detector array 14 in the piston mode of operation. The relative power intensity pattern indicates a signal level that may be received by detector array 14 due to receipt of backscattered light 26. The vertical axis indicates the relative power intensity over an area defined by X and Y axes. The relative power intensity is normalized to 0.0 dB and the X and Y axes have coordinates in units of λ/D, where D is the exit pupil diameter of detector array 14 and λ is the average wavelength of the laser energy. This particular graph indicates the relative power intensity of detector array 14 in the far field. As shown, combining signals equally from all detectors 14a, 14b, 14c, and 14d with no phase shift results in one major lobe centered about the origin of the X and Y axes.

Heterodyne operation of detector array 14 derives the signal by frequency analysis of the beat between the signal and the local oscillator. For example, consider the D1 mode which is illustrated in FIG. 2B. The beat signal from the left half of the quad detector can be written as $$\text{Quad}^{1,2} = A_1 \exp(i(\omega + \omega_D{}^1)t) \otimes A_{LO} \exp(-i(\omega^*{}_{LO})t)$$
$$\rightarrow A \exp(i(\omega - \omega^*{}_{LO} + \omega_D{}^1)t)$$

where A1 is the amplitude of the backscattered signal, $A_{LO}$ is the local oscillator amplitude, and ω represents the carrier (laser) frequency. $\omega^*{}_{LO}$ is the local oscillator frequency at the time of the detection (delayed by the round trip time which may have an offset and additional drift from laser noise), and $\omega_D^1$ is the Doppler shift from target motion. The bottom half signal is similarly written as $$\text{Quad}^{3,4} = A_1 \exp(i(\omega + \omega_D^2)t) \otimes A_{LO} \exp(-i(\omega^*_{LO})t)$$
$$\rightarrow A \exp(i(\omega - \omega^*_{LO} - \omega_D^1)t)$$

where the $\omega_D^1$ in the last term is 180 degrees out of phase component related to the top half. By mixing these two terms to baseband, all frequency content gets subtracted, except for the out of phase target Doppler $$\text{Sig} = \text{Quad}^{1,2} \otimes \text{Quad}^{3,4} = A' \exp(i2\omega_D^1 t)$$

The local oscillator phase noise gets canceled out (since it is common mode in both terms), along with other 'common mode' frequency noise terms, which may include atmosphere piston noise. This is the expected result for differential processing. In the particular embodiment in which detector array 14 is a quad detector, six independent differential signals may be formed that are correlated to one another. This is because target vibration, no matter where it is measured on the target, may be correlated to the target power plant which drives the vibration signature. In some embodiments, these independent measures may provide for the construction of additional processing by looking for correlations between the various differential signals.

Figure 3A:
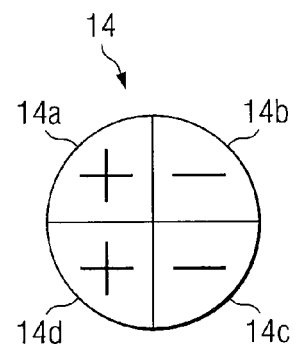
FIG. 3A is front elevational view of the detector array of FIG. 1 having four detectors with "+" and "−" symbols indicating that the differential signal analyzer combines their signals to determine a horizontal vibration mode.
Figure 3B:
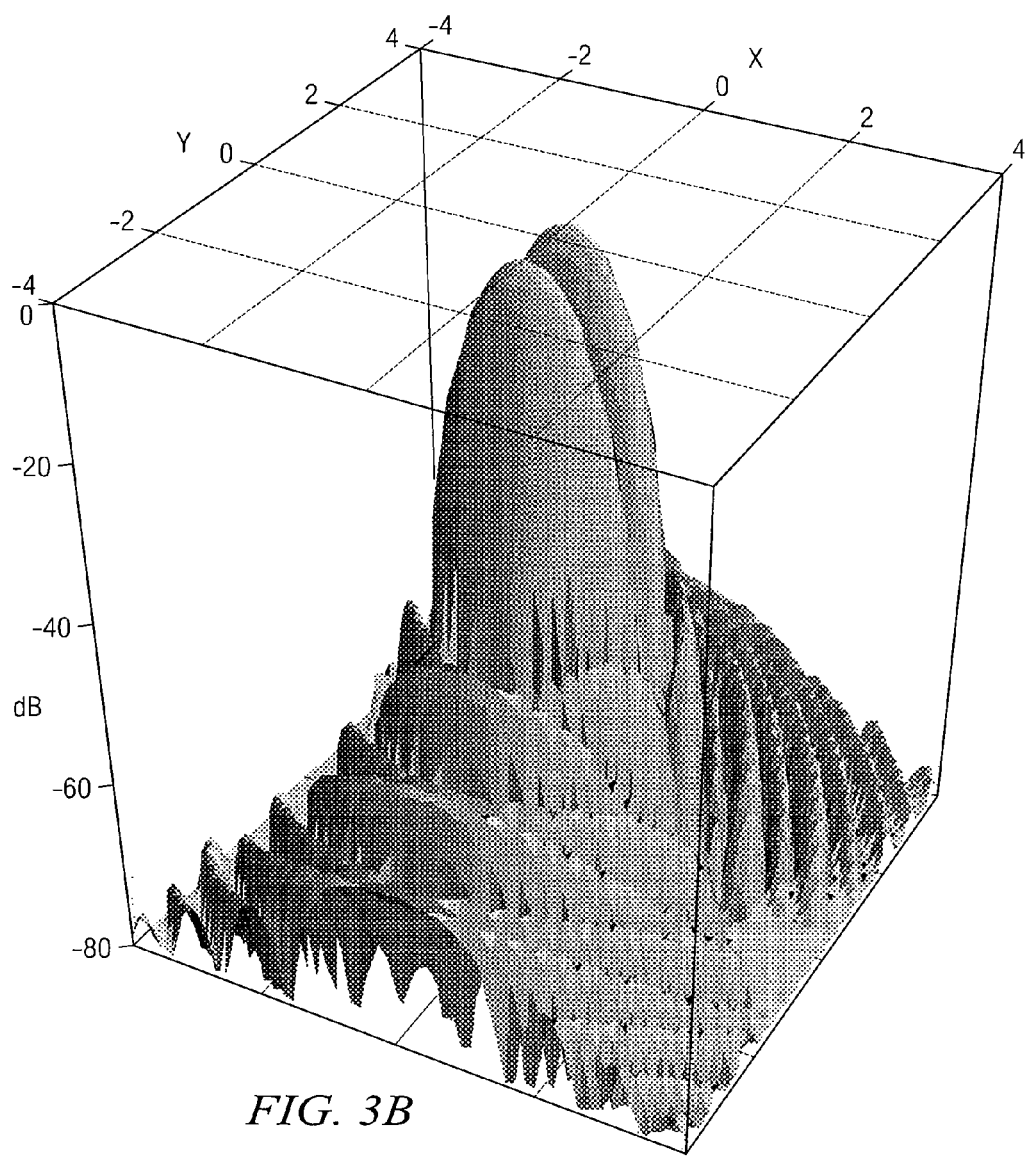
FIG. 3B is a three-dimensional graph showing a resulting power intensity pattern due to combining signals from detector array according to the arrangement of FIG. 3A.

FIGS. 3A and 3B show a diagram of detector array 14 and another three-dimensional graph, respectively, showing a resulting power intensity pattern due to combining signals from detector array 14 according to the horizontal mode of operation in which X is designated as the horizontal axis. By phase shifting signals from detectors 3 and 4 and combining with signals from detectors 1 and 2, a resulting dual lobed pattern is developed that represents the relative power intensity of the differential signal generated by differential signal analyzer 16. This dual lobed pattern may be associated with horizontal vibration movement element of target 24. Although not shown, phase shifting signals from detectors 2 and 3 and combining with signals from detectors 1 and 4 may yield of dual lobed pattern that traverses the Y axis corresponding to vertical vibration movement of target 24.

Figure 4A:
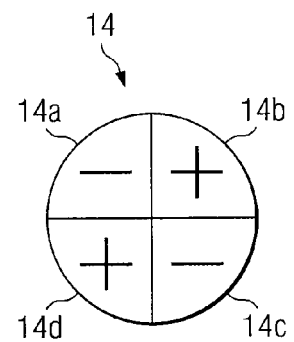
FIG. 4A is front elevational view of the detector array of FIG. 1 having four detectors with "+" and "−" symbols indicating that the differential signal analyzer combines their signals to determine a tilt vibration mode.
Figure 4B:
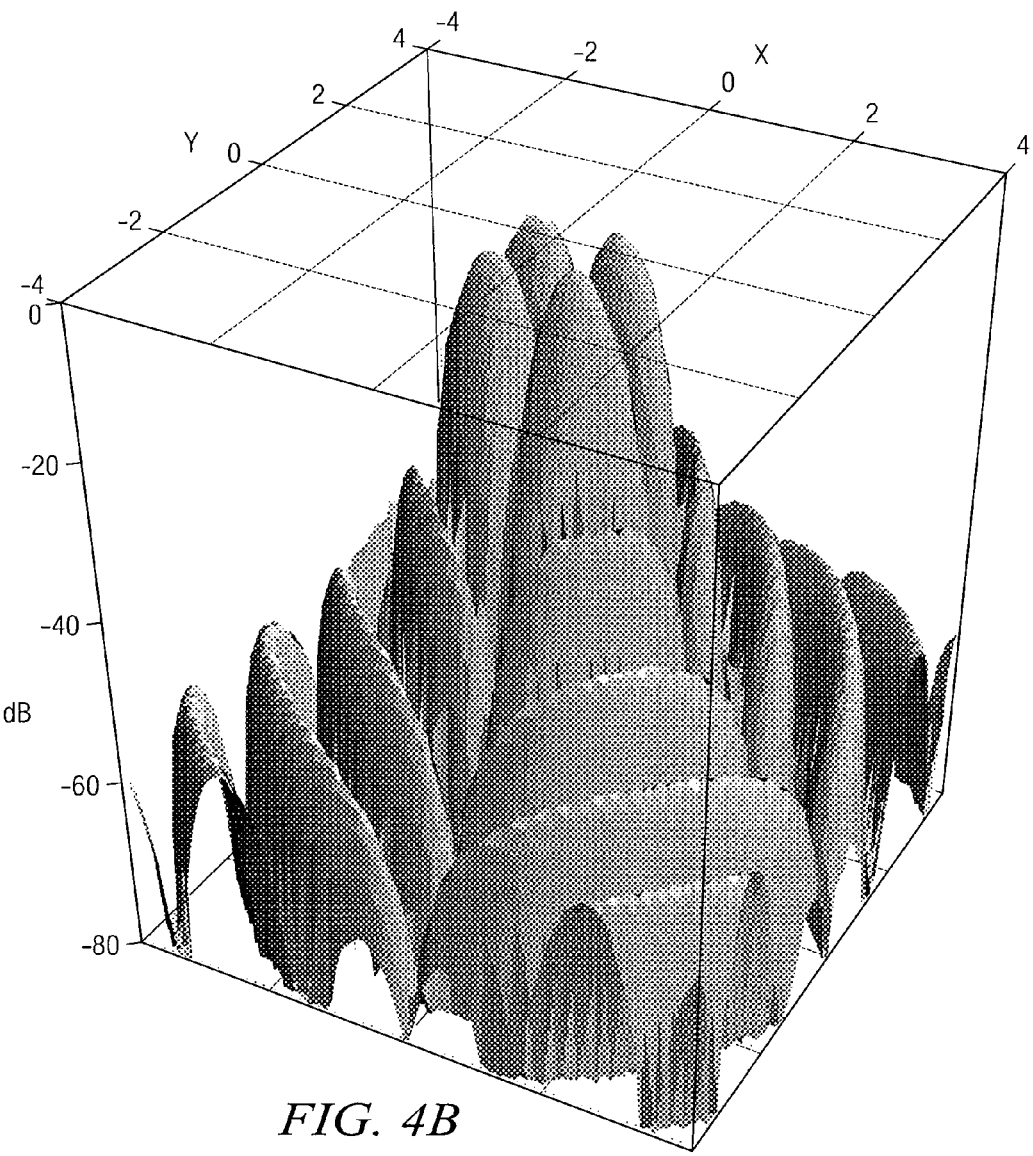
FIG. 4B is a three-dimensional graph showing a resulting power intensity pattern due to combining signals from detector array according to the arrangement of FIG. 4A.

FIGS. 4A and 4B show a diagram of detector array 14 and another three-dimensional graph, respectively, showing a resulting power intensity pattern due to combining signals from detector array 14 according to the tilt vibration mode. By phase shifting signals from detectors 1 and 3 and combining with signals from detectors 2 and 4, a resulting dual lobed pattern is developed that represents the relative power intensity of the differential signal generated by differential signal analyzer 16. This dual lobed pattern may be associated with the tilt vibrational element of target 24.

Modifications, additions, or omissions may be made to differential mode laser detection and ranging device 10 without departing from the scope of the disclosure. The components of differential mode laser detection and ranging device 10 may be integrated or separated. For example, detector array 14 may be fed directly by local oscillator 13 for providing a heterodyning action. Moreover, the operations of differential mode laser detection and ranging device 10 may be performed by more, fewer, or other components. For example, differential signal analyzer 16 may be operable to process the various vibration modes independently of transmission mode used, such as pulse doublet, continuous wave. That is, laser detection and ranging device 10 may be operable to process various types of differential vibration modes using various types of light sources commonly implemented with laser detection and ranging devices. Additionally, operations of differential signal analyzer 16 may be performed using any suitable logic comprising software, hardware, and/or other logic.

Figure 5:
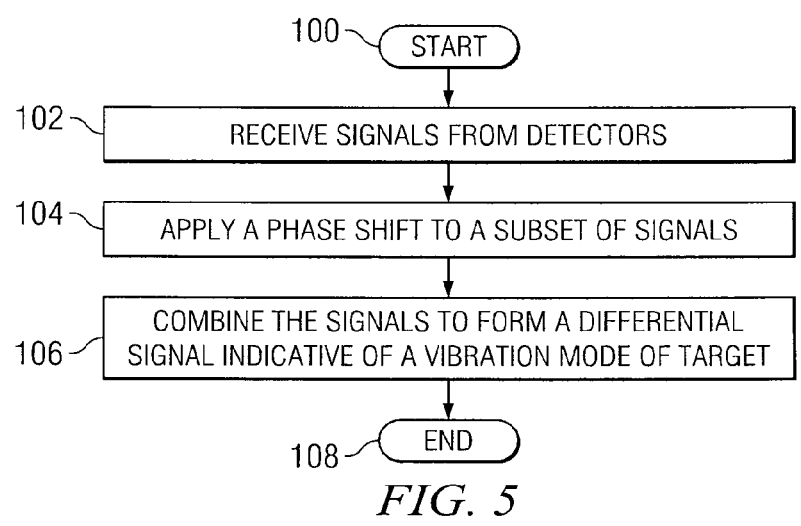
FIG. 5 is a flowchart showing one embodiment of a series of actions that may be performed by the differential mode laser detection and ranging device of FIG. 1 to generate various differential signals representative of various corresponding vibrational modes of a target.

FIG. 5 is a flowchart showing one embodiment of a series of actions that may be performed by differential signal analyzer 16 to generate a differential signal representative of various vibrational modes of a target 24. In act 100, the process is initiated.

In act 102, differential signal analyzer 16 receives signals from each of the detectors 14a, 14b, 14c, and 14d. In one embodiment, laser 12 is a laser in which laser detection and ranging device 10 is a laser detection and ranging device. In another embodiment, one or more of the received signals may be filtered using cross-correlation based filters that may be operable to suppress channel specific noise. These cross-correlation based filters may be implemented with hardware or as a set of instructions in software in memory 34. In another embodiment, these cross-correlation filters may be adjustable to compensate for changes in atmospheric conditions or the type of target 24 to be measured.

In act 104, differential signal analyzer 16 applies a phase shift to one or more of the received signals. In a particular embodiment in which detector are spatially separated from one another and aligned along a plane that is generally perpendicular to the direction of the received backscattered light 26, a phase shift of approximately 180 degrees may yield differential signals having lateral components, such as horizontal, vertical, or tilt vibrational modes. In other embodiments, applying a phase shift of 90 degrees to certain detectors and 180 degrees to certain other detectors 14a, 14b, 14c, and 14d may yield differential signals having left and right handed tortional components.

In act 106, differential signal analyzer 16 combines the signals from detectors 14a, 14b, 14c, and 14d to form a differential signal representative of various vibrational modes of target 24. In one embodiment, multiple differential signal may be simultaneously generated by differential signal analyzer 16. In this manner, differential signal associated with the various vibrational modes may be compared with one another to enhance target 24 identification.

The previously described actions are continually performed throughout operation of laser detection and ranging device 10. When operation of laser detection and ranging device 10 is no longer needed or desired, the process ends in act 108.

Although the present disclosure has been described with several embodiments, a myriad of changes, variations, alterations, transformations, and modifications may be suggested to one skilled in the art, and it is intended that the present disclosure encompass such changes, variations, alterations, transformation, and modifications as they fall within the scope of the appended claims.

What is claimed is:

1. A system for measuring vibration comprising:
   a laser light source that generates a coherent light beam onto a target;
   at least four detectors that each detects backscattered light from the target by the coherent light beam, each of the plurality of detectors aligned along a plane that is generally normal to the direction of the backscattered light;
   a differential signal analyzer coupled to each of the plurality of detectors and operable to:
   receive at least four signals each representative of a magnitude of the backscattered light from each of the at least four detectors;
   apply a first phase shift to the first signal and a third signal and combine the phase shifted signals with the second signal and a fourth signal to form a horizontal differential signal representative of horizontal vibration of the target;

apply a second phase shift to the first and second detectors to form a second phase shifted signal and combine the second phase shifted signal with the third signal and the fourth signal to form a second differential signal, the first phase shift and the second phase shift being essentially 180 degrees; and apply a third phase shift to the second signal, a fourth phase shift to the fourth signal, a fifth phase shift to the third signal, and combine the third phase shifted signal, the fourth phase shifted signal, and the fifth phase shifted signal with the first signal to form the differential signal comprising a tortional vibration mode of the target, the third phase shift being essentially 90 degrees, the fourth phase shift being essentially −90 degrees, and the fifth phase shift being essentially 180 degrees.

2. The system of claim 1, further comprising a first telescope optically coupled to the light source and operable to direct the coherent light beam toward the target.

3. The system of claim 2, further comprising a second telescope optically coupled to the plurality of detectors and operable to direct the backscattered light onto the plurality of detectors, the second telescope being independent from the first telescope.

4. The system of claim 1, further comprising a beam splitter that is operable to reflect a portion of the coherent light beam toward the at least four detectors.

5. A system for measuring vibration comprising:
a light source that generates a coherent light beam onto a target;
a plurality of spatially separated detectors that each detects backscattered light from the target by the coherent light beam;
a differential signal analyzer coupled to each of the plurality of detectors and operable to:
receive a plurality of signals each representative of a magnitude of the backscattered light from each of the plurality of detectors;
apply at least one phase shift to at least a first signal of the plurality of signals relative to at least a second signal of the plurality of signals to produce at least one phase shifted signal; and
combine the at least one phase shifted signal with the second signal to form a differential signal representative of physical vibration of the target;
wherein the plurality of detectors comprises four detectors, the differential signal analyzer operable to apply the phase shift to the first signal and a third signal and combine the phase shifted signals with the second signal and a fourth signal to form the differential signal; and
wherein the differential signal analyzer is operable to apply a second phase shift to the first and second detectors to form a second phase shifted signal and combine the second phase shifted signal with the third signal and the fourth signal to form a second differential signal, the first phase shift and the second phase shift being essentially 180 degrees.

6. A system for measuring vibration comprising:
a light source that generates a coherent light beam onto a target;
a plurality of spatially separated detectors that each detects backscattered light from the target by the coherent light beam;
a differential signal analyzer coupled to each of the plurality of detectors and operable to:
receive a plurality of signals each representative of a magnitude of the backscattered light from each of the plurality of detectors;
apply at least one phase shift to at least a first signal of the plurality of signals relative to at least a second signal of the plurality of signals to produce at least one phase shifted signal; and
combine the at least one phase shifted signal with the second signal to form a differential signal representative of physical vibration of the target;
wherein the plurality of detectors comprises four detectors, the differential signal analyzer operable to apply the phase shift to the first signal and a third signal and combine the phase shifted signals with the second signal and a fourth signal to form the differential signal; and
wherein the differential signal analyzer is operable to apply a third phase shift to the second signal, a fourth phase shift to the fourth signal, a fifth phase shift to the third signal, and combine the third phase shifted signal, the fourth phase shifted signal, and the fifth phase shifted signal with the first signal to form the differential signal comprising a tortional vibration mode of the target, the third phase shift being essentially 90 degrees, the fourth phase shift being essentially −90 degrees, and the fifth phase shift being essentially 180 degrees.

7. The system of claim 5, wherein each of the plurality of detectors are aligned along a plane that is generally normal to the direction of the backscattered light.

8. The system of claim 5, wherein the light source is a laser.

9. The system of claim 5, further comprising a first telescope optically coupled to the light source and operable to direct the coherent light beam toward the target.

10. The system of claim 9, further comprising a second telescope optically coupled to the plurality of detectors and operable to direct the backscattered light onto the plurality of detectors, the second telescope being independent from the first telescope.

11. The system of claim 5, further comprising a beam splitter that is operable to reflect a portion of the coherent light beam toward the plurality of detectors.

12. A method for measuring vibration comprising:
receiving a plurality of signals each representative of a magnitude of backscattered light from each of a plurality of spatially separated detectors, the backscattered light being generated by a coherent light beam and reflected from a target;
applying at least one phase shift to at least a first signal of the plurality of signals relative to at least a second signal of the plurality of signals to produce at least one phase shifted signal;
combining the at least one phase shifted signal with at least the second signal to form a differential signal representative of physical vibration of the target;
wherein applying at least one phase shift comprises applying a first phase shift to the first signal and a third signal to produce first phased shifted signals, and combining the at least one phase shifted signal with at least the second signal comprises combining the first phase shifted signals with the second signal and a fourth signal of the plurality of signals to form the differential signal, the plurality of detectors comprising four detectors; and
applying a second phase shift to the first and second signals relative to the third signal to form second phase shifted signals, and combining the second phase shifted signals with the third signal and the fourth signal to form a second differential signal, the first phase shift and the second phase shift being essentially 180 degrees.

13. A method for measuring vibration comprising:
receiving a plurality of signals each representative of a magnitude of backscattered light from each of a plurality of spatially separated detectors, the backscattered light being generated by a coherent light beam and reflected from a target;
applying at least one phase shift to at least a first signal of the plurality of signals relative to at least a second signal of the plurality of signals to produce at least one phase shifted signal;
combining the at least one phase shifted signal with at least the second signal to form a differential signal representative of physical vibration of the target;
wherein applying at least one phase shift comprises applying a first phase shift to the first signal and a third signal to produce first phased shifted signals, and combining the at least one phase shifted signal with at least the second signal comprises combining the first phase shifted signals with the second signal and a fourth signal of the plurality of signals to form the differential signal, the plurality of detectors comprising four detectors; and
wherein applying at least one phase shift further comprises applying a second phase shift to the second signal, a third phase shift to the fourth signal, a fourth phase shift to the third, and combining at least one phase shifted signal with at least the second signal further comprises combining the second phase shifted signal, the third phase shifted signal, and the fourth phase shifted signal, with the first signal to form the differential signal comprising a torsional vibration mode of the target, the third phase shift being essentially 90 degrees, the fourth phase shift being essentially −90 degrees, and the fifth phase shift being essentially 180 degrees.

14. The method of claim 12, wherein receiving a plurality of signals from a plurality of spatially separated detectors comprises receiving a plurality of signals from a plurality of spatially separated detectors that are aligned along a plane that is generally normal to the direction of the backscattered light.

15. The method of claim 12, wherein receiving the plurality of signals from the plurality of detectors comprises receiving the plurality of signals that are mixed with a portion of the coherent light beam through a beam splitter.

16. The method of claim 12, further comprising mixing the first signal and the second signal with a local oscillator signal from a local oscillator.

* * * * *